US010768852B2

United States Patent
Ni et al.

(10) Patent No.: US 10,768,852 B2
(45) Date of Patent: Sep. 8, 2020

(54) BATCH AUTOMATIC TEST METHOD FOR SOLID STATE DISKS AND BATCH AUTOMATIC TEST DEVICE FOR SOLID STATE DISKS

(71) Applicants: SHENZHEN SHICHUANGYI ELECTRONICS CO., LTD, Shenzhen (CN); Silicon Motion, Inc., Zhubei, Hsinchu County (TW)

(72) Inventors: Huang-Zhong Ni, Shenzhen (CN); Jun Cheng, Shenzhen (CN)

(73) Assignees: SHENZHEN SHICHUANGYI ELECTRONICS CO., LTD, Shenzhen (CN); SILICON MOTION, INC., Zhubei (TW)

( * ) Notice: Subject to any disclaimer, the term of this patent is extended or adjusted under 35 U.S.C. 154(b) by 0 days.

(21) Appl. No.: 16/288,611

(22) Filed: Feb. 28, 2019

(65) Prior Publication Data
US 2019/0272116 A1 Sep. 5, 2019

(30) Foreign Application Priority Data
Mar. 2, 2018 (CN) .......................... 2018 1 0174616

(51) Int. Cl.
*G06F 13/00* (2006.01)
*G06F 3/06* (2006.01)

(52) U.S. Cl.
CPC .......... *G06F 3/0653* (2013.01); *G06F 3/0604* (2013.01); *G06F 3/0679* (2013.01)

(58) Field of Classification Search
CPC .... G06F 3/0653; G06F 3/0604; G06F 3/0679; G06F 3/0616; G06F 11/07; G06F 3/0659; G11C 29/56
See application file for complete search history.

(56) References Cited

U.S. PATENT DOCUMENTS 7,873,885 B1 * 1/2011 Shin ....................... G11C 29/56
365/185.33
10,162,006 B2 * 12/2018 Athimolom .... G01R 31/318597
(Continued)

FOREIGN PATENT DOCUMENTS

CN 105487952 A * 4/2016
CN 110209544 A * 9/2019
(Continued)

*Primary Examiner* — Jing-Yih Shyu
(74) *Attorney, Agent, or Firm* — Birch, Stewart, Kolasch & Birch, LLP

(57) ABSTRACT

A batch automatic test method and a batch automatic test device for solid state disks are provided. The batch automatic test method is used for testing a plurality of solid state disks by a batch automatic test device. The solid state disks are coupled to the batch automatic test device. The batch automatic test method includes the following steps. A plurality of buses of the batch automatic test device are scanned to mark the solid state disks and a system disk. A piece of disk information of each of the solid state disks is shown. Each of the pieces of the disk information includes a disk location of each of the solid state disks. A formatting procedure is synchronously performed on the solid state disks according to the disk locations. After performing the formatting procedure, a burn-in test procedure is automatically and synchronously performed on the solid state disks.

12 Claims, 4 Drawing Sheets

(56) References Cited

U.S. PATENT DOCUMENTS

| | | | |
|---|---|---|---|
| 2011/0087899 A1 | 4/2011 | Fetik | |
| 2013/0124932 A1* | 5/2013 | Schuh | G11C 29/08 714/718 |
| 2014/0059178 A1* | 2/2014 | Dutta | H04L 41/0883 709/219 |
| 2015/0287478 A1* | 10/2015 | Chen | G11C 29/26 714/719 |
| 2016/0111169 A1* | 4/2016 | Kim | G11C 29/12005 714/718 |

FOREIGN PATENT DOCUMENTS

| | | |
|---|---|---|
| KR | 10-2009-0046567 A | 5/2009 |
| KR | 101885465 B1 * | 8/2018 |

* cited by examiner

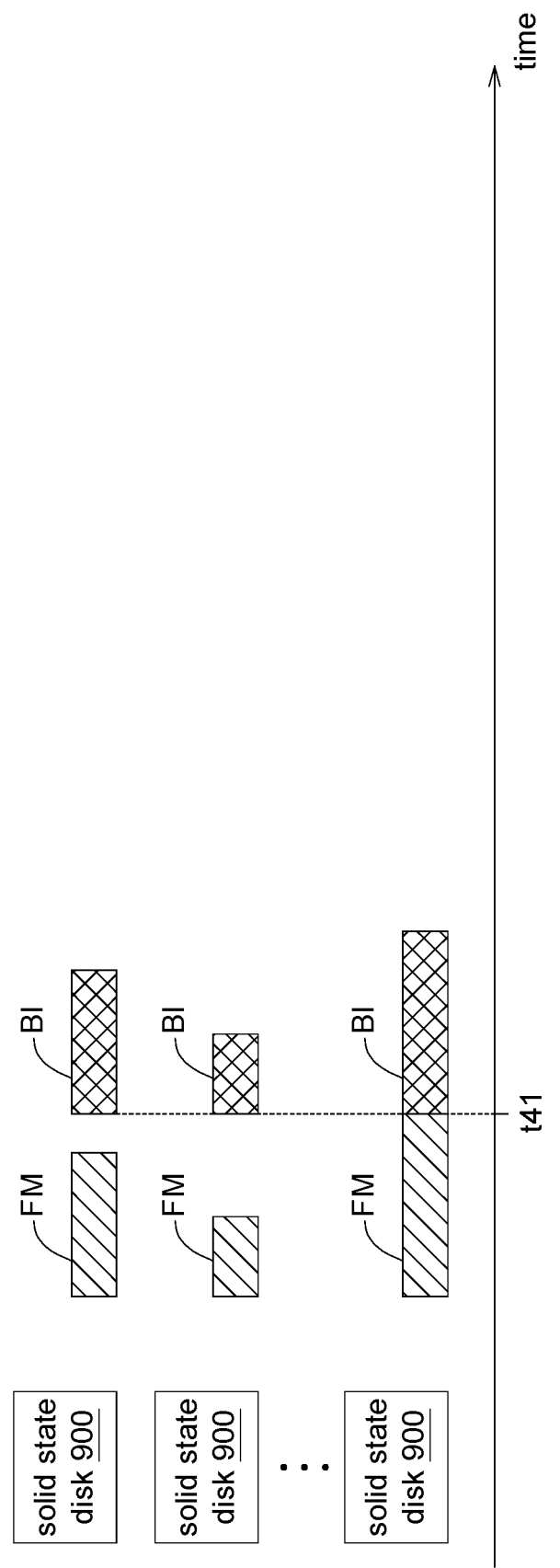

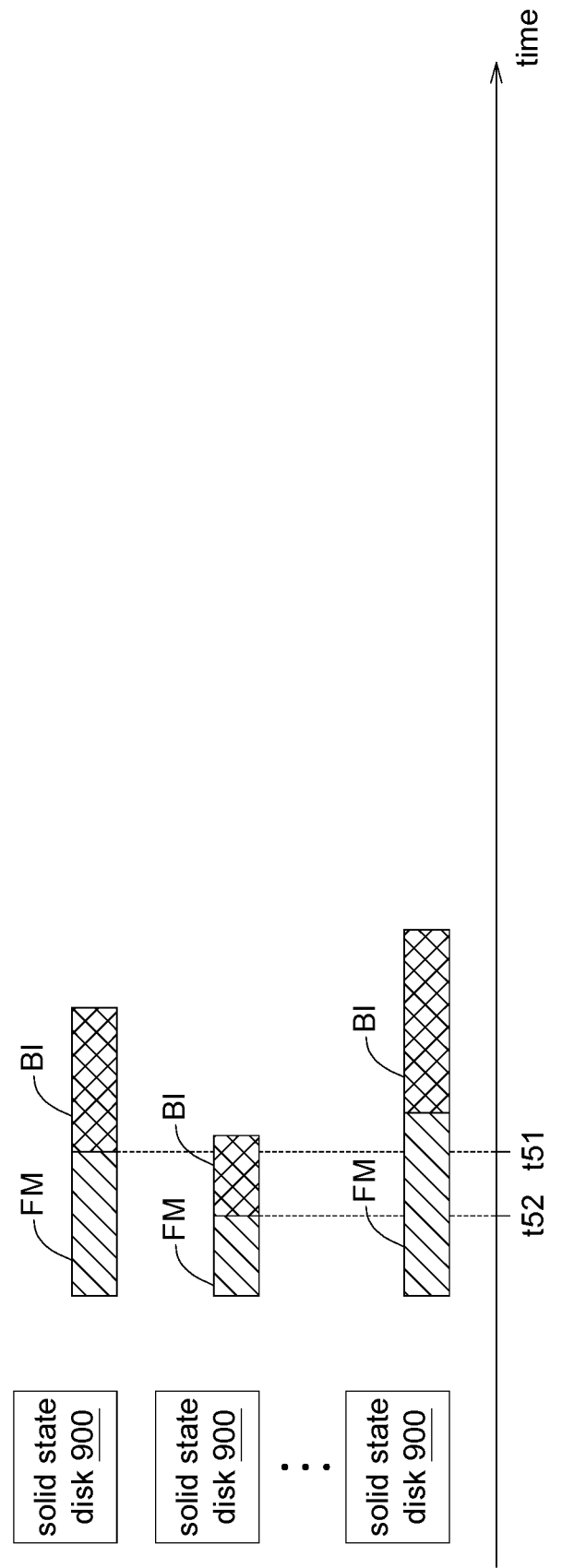

BATCH AUTOMATIC TEST METHOD FOR SOLID STATE DISKS AND BATCH AUTOMATIC TEST DEVICE FOR SOLID STATE DISKS

This application claims the benefit of People's Republic of China application Serial No. 201810174616.9, filed Mar. 2, 2018, the disclosure of which is incorporated by reference herein in its entirety.

TECHNICAL FIELD

The disclosure relates in general to a batch automatic test method and a batch automatic test device, and more particularly to a batch automatic test method for solid state disks and a batch automatic test device for solid state disks.

BACKGROUND

With the development of digital technology, people are increasingly demanding the storage of digital data. Digital data can be stored on Hard Disk Drive (HDD). Traditional hard disk uses magnetic rotating disk to store digital data. Reading and writing are operated through the magnetic head.

In recent years, the development of the solid state disk (SSD) (or called solid state drive) is a new milestone in hard disk technology. In the solid state disk, a non-volatile memory, such as a NAND flash memory, is used to store data. The solid state disk has the advantages of fast access speed, low power consumption, low damage, small size, etc., and the development of the solid state disk is quite emphasized.

Before the solid state hard disk is shipped from the factory, it needs to be coupled to the computer to perform a series of tests to ensure the product yield. However, the operator must insert and remove the solid state hard disks one by one to carry out several test programs. Not only is it cumbersome in the test program, but it is prone to errors.

SUMMARY

The disclosure is directed to a batch automatic test method for solid state disks and a batch automatic test device for solid state disks. The batch automatic test device automatically performs a scanning procedure, a formatting procedure and a burn-in procedure on the solid state disks without inserting and removing the solid state hard disks one by one. The operations are significantly speeded up and the chance of operational errors is reduced.

According to one embodiment, a batch automatic test method for a plurality of solid state disks is provided. The batch automatic test method is used for automatically testing the solid state disks by a batch automatic test device. The solid state disks are coupled to the batch automatic test device. The batch automatic test method includes the following steps. A plurality of buses of the batch automatic test device are scanned to mark the solid state disks and a system disk. A piece of disk information of each of the solid state disks is displayed. Each of the pieces of the disk information includes a disk location of each of the solid state disks. A formatting procedure is synchronously performed on the solid state disks according to the disk locations. A burn-in test procedure is automatically and synchronously performed on the solid state disks after performing the formatting procedure.

According to another embodiment, a batch automatic test device for automatically testing a plurality of solid state disks is provided. The batch automatic test device includes a plurality of buses, a scanning unit, a display unit, a formatting unit and a burn-in unit. The buses are configured to be coupled to the solid state disks. The scanning unit is configured to scan the buses, to mark the solid state disks and a system disk. The display unit is configured to display one piece of disk information of each of the solid state disks. Each of the pieces of the disk information includes a disk location of each of the solid state disks. The formatting unit is configured to synchronously perform a formatting procedure on the solid state disks according to the disk locations. The burn-in unit is configured to automatically and synchronously perform a burn-in test procedure on the solid state disks after performing the formatting procedure.

BRIEF DESCRIPTION OF THE DRAWINGS

FIG. 4 shows a timing diagram of the formatting procedure and the burn-in test procedure according to another embodiment.

FIG. 5 shows a timing diagram of the formatting procedure and the burn-in test procedure according to another embodiment.

Figure 1:
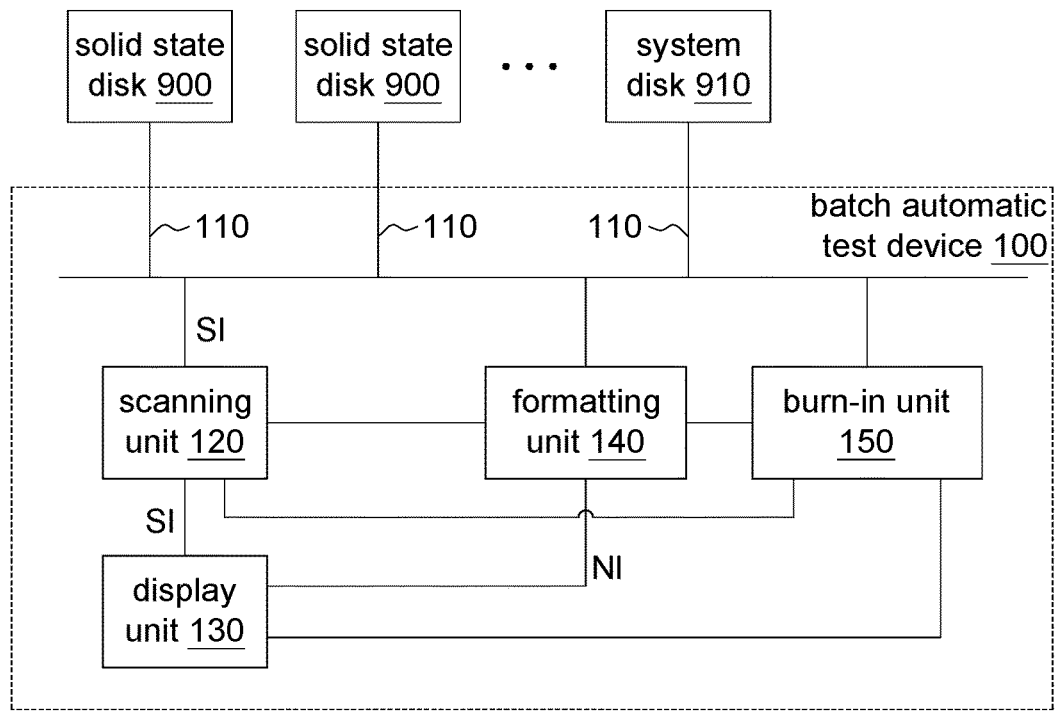
FIG. 1 shows a batch automatic test device for a plurality of solid state disks according to one embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Please refer to FIG. 1, which shows a batch automatic test device 100 for a plurality of solid state disks (SSD) (or called solid state drives) 900 according to one embodiment. The batch automatic test device 100 is used for automatically testing the solid state disks 900 without inserting and removing the solid state disks 900 one by one. Each of the solid state disks 900 includes a memory for storing data. For example, each of the solid state disks 900 may be composed of NAND memories.

The batch automatic test device 100 includes a plurality of buses 110, a scanning unit 120, a display unit 130, a formatting unit 140 and a burn-in unit 150. The buses 110 are coupled to the solid state disks 900. For example, each of the buses 110 is a SATA bus or a PCI bus. The scanning unit 120 is used for scanning the devices coupled to the buses 110 to obtain some information. The formatting unit 140 is used for performing a formatting procedure FM (shown in FIGS. 3 to 5). The burn-in unit 150 is used for performing a burn-in test procedure BI (shown in FIGS. 3 to 5). For example, each of the scanning unit 120, the formatting unit 140 and the burn-in unit 150 is a chip, a firmware, a circuit, a circuit board or a storage device storing a plurality of program codes. The display unit 130 is used for displaying some information. For example, the display unit 130 is a display screen or a warning light. The following is a more detailed description of the operation of the above components.

Figure 2:
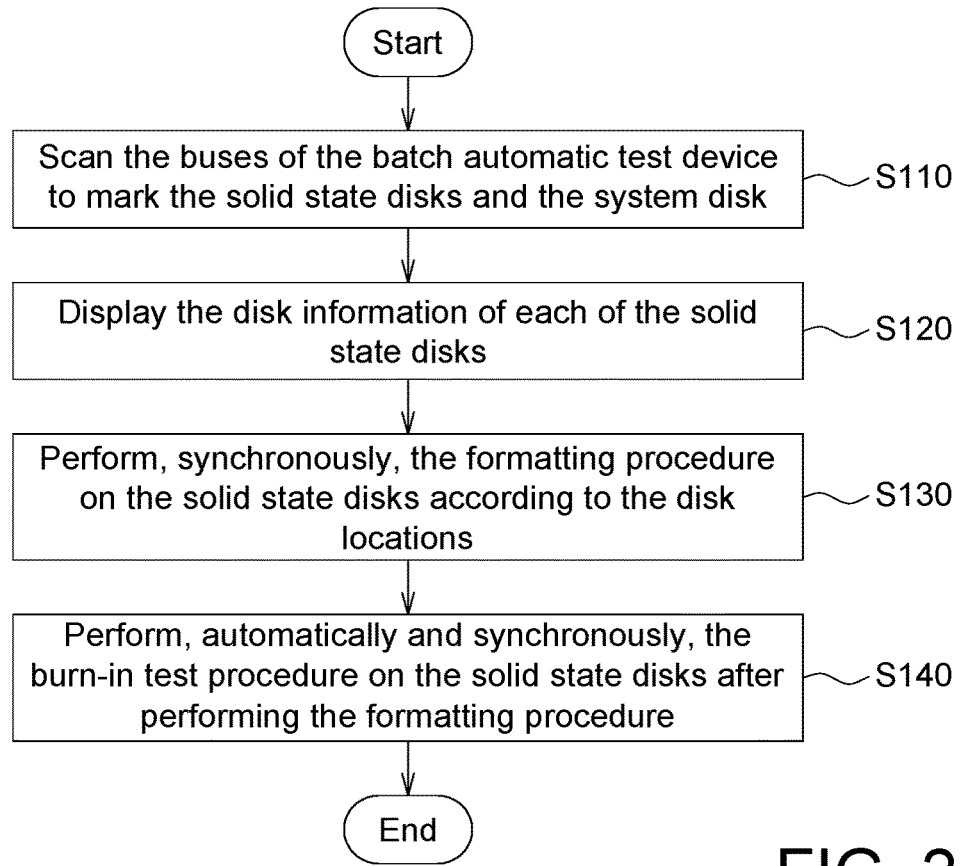
FIG. 2 shows a flowchart of a batch automatic test method for the solid state disks.

Please refer to FIG. 2, which shows a flowchart of a batch automatic test method for the solid state disks 900. In step S110, the scanning unit 120 scans the buses 110 of the batch automatic test device 100 to mark the solid state disk 900 and a system disk 910. Each of the solid state disks 900 is a disk to be tested, the system disk 910 is not the disk to be tested. The operating system of the batch automatic test device 100 is installed in the system disk 910. In one embodiment, the system disk 910 may be a solid state disk. In one embodiment, the system disk 910 may not be a solid state disk. For example, the system disk 910 may be a magnetic disk. The solid state disks 900 can be provided with different manufacturers, different types, different capacities or different model numbers. Moreover, in the present embodiment, the number of the solid state disks 900 is not limited. One or more solid state disks 900 can be synchronously tested via the batch automatic test method of the present embodiment.

In one embodiment, the number of the system disk(s) 910 may be larger than one, and the scanning unit 120 can mark them. After scanning by the scanning unit 120, a piece of disk information SI of each of the solid state disks 900 can be obtained. For example, the piece of the disk information SI may be a hard disk location, a hard disk capacity, a serial number and a model number.

The number of the solid state disks 900 may be less than the number of the buses 110. The scanning unit 120 only scans some of the buses which are coupled to the solid state disks 900 or the system disk 910. After the step S110 of scanning, the pieces of the disk information SI of the several solid state disks 900 can be obtained at one time, without scanning one by one.

Or, in one embodiment, the batch automatic test device 100 may support SATA hot plug, and let the solid state disks 900 can be removed or coupled to the buses 110 at any time. In this situation, once any one solid state disk 900 is removed or coupled to one of the buses 110, the scanning unit 120 will scan the buses 110 for immediately obtain the piece of the disk information SI.

Next, in step S120, the display unit 130 displays each of the pieces of the disk information SI of each of the solid state disks 900. When one of the pieces of the disk information SI of one solid state disks 900 is correctly displayed on the display unit 130, it means that this solid state disk 900 is correctly coupled to one of the buses 110.

Then, in the step S130, the formatting unit 140 synchronously performs the formatting procedure FM on the solid state disks 900 according to the disk locations. In this step, the solid state disks 900 coupled to the buses 110 are synchronously performed the formatting procedure FM by the formatting unit 140. During the formatting procedure FM performed on the solid state disks 900, the operator does not need to insert and remove the solid state disks 900 one by one, and does not need to actuate the formatting procedure FM for the solid state disks 900 one by one.

In one embodiment, the batch automatic test device 100 may have the parallel processing capability, such that the formatting procedure FM can be performed on the solid state disks 900 at the same time for speeding up the operation. Or, in another embodiment, the batch automatic test device 100 can uninterruptedly and sequentially perform the formatting procedure FM on the solid state disks 900 without repeatedly actuating the formatting procedure FM.

In step S130, the formatting unit 140 formats each of the solid state disk 900 to be a MBR Master Boot Record) disk or a GPT (GUID Partition Table) disk, and each of the solid state disks 900 is formatted to be a FAT file system disk, a HPFS file system disk or a NTFS file system disk. The choice of the MBR disk or the GPT disk can be predetermined before performing the formatting procedure FM. The choice of the FAT file system disk, the HPFS file system disk or the NTFS file system disk can be predetermined before performing the formatting procedure FM.

If one of the solid state disks 900 does not pass the formatting procedure FM, the formatting unit 140 requires the display unit 130 to display a failed message NI. The operator can know which solid state disk 900 is damaged and cannot pass the formatting procedure FM.

Next, in step S140, the burn-in unit 150 automatically and synchronously performs the burn-in test procedure BI on the solid state disks 900. In the burn-in test procedure BI, each of the solid state disks 900 is performed a plurality of simulation tests to test a durability, a reliability and a stability.

The step S140 is automatically performed after the step S130 without any command. That is to say, once the formatting unit 140 completes the formatting procedure FM, the burn-in unit 150 is notified and immediately starts to perform the burn-in test procedure BI.

In one embodiment, after all of the solid state disks 900 are performed the formatting procedure FM, the burn-in unit 150 automatically performs the burn-in test procedure BI. If any one of the solid state disks 900 does not pass the formatting procedure FM, the burn-in test procedure BI will be still performed on others of the solid state disks 900 which pass the formatting procedure FM.

Or, in one embodiment, after any one of the solid state disks 900 is completely performed the formatting procedure FM, the burn-in unit 150 can immediately perform the burn-in test procedure BI on this solid state disk 900.

In step S140, the burn-in unit 150 automatically and synchronously performs the burn-in test procedure BI on the solid state disks 900 coupled to the buses 110. When the burn-in test procedure BI are performed on the solid state disks 900, the operator does not need to insert and remove the solid state disks 900 one by one, and does not need to actuate the burn-in test procedure BI for the solid state disks 900 one by one.

In one embodiment, the batch automatic test device 100 may have the parallel processing capability, such that the burn-in test procedure BI can be performed on the solid state disks 900 at the same time for speeding up the operation. Or, in another embodiment, the batch automatic test device 100 can uninterruptedly and sequentially perform the burn-in test procedure BI on the solid state disks 900 without actuating the burn-in test procedure BI for the solid state disks 900 one by one.

Figure 3:
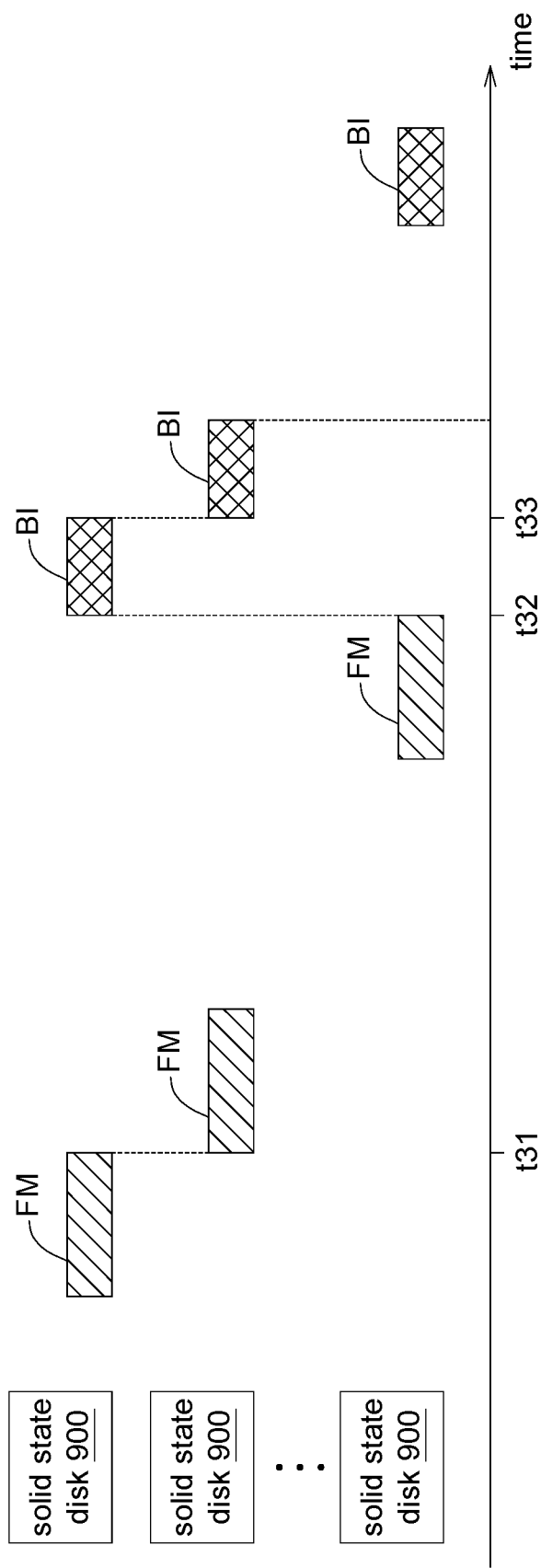
FIG. 3 shows a timing diagram of a formatting procedure and a burn-in test procedure according to one embodiment.

For example, the formatting procedure FM and the burn-in test procedure BI are illustrated via several timing diagrams. Please refer to FIG. 3, which shows a timing diagram of the formatting procedure FM and the burn-in test procedure BI according to one embodiment. In FIG. 3, after the formatting procedure FM is completely performed on the first solid state disk 900 at the time point t31, the formatting procedure FM is immediately performed on the second solid state disk 900 without any interruption. That is to say, the solid state disks 900 are uninterruptedly and sequentially performed the formatting procedure FM without repeatedly actuating the formatting procedure FM. Moreover, after the formatting procedure FM is completely performed on the last solid state disk 900 at the time point t32, the burn-in test procedure BI is immediately performed on the first solid state disk 900 without any interruption. Similarly, after the burn-in test procedure BI is completely performed on the first solid state disk 900 at the time point t33, the burn-in test procedure BI is immediately performed on the second solid state disk 900 without any interruption. That is to say, the solid state disks 900 are uninterruptedly and sequentially performed the burn-in test procedure BI without repeatedly actuating the burn-in test procedure BI. As such, for performing the formatting procedure FM and the burn-in test procedure BI on the solid state disks 900, the operator does not insert and remove the solid state disks 900 one by one.

Please refer to FIG. 4, which shows a timing diagram of the formatting procedure FM and the burn-in test procedure BI according to another embodiment. In FIG. 4, the batch automatic test device 100 have the parallel processing capability, such that the formatting procedure FM can be performed on the solid state disks 900 at the same time. The required times for performing the formatting procedure FM on the solid state disks 900 are not necessarily the same. After the formatting procedure FM are performed on all of the solid state disks 900 at the time point t41, the burn-in test procedure BI are immediately performed on all of the solid state disks 900 without any interruption. Similarly, the burn-in test procedure BI are performed on all of the solid state disks 900 at the same time. The required times for performing the burn-in test procedure BI on the solid state disks 900 are not necessarily the same. As such, for performing the formatting procedure FM and the burn-in test procedure BI on the solid state disks 900, the operator does not need to insert and remove the solid state disks 900 one by one.

Please refer to FIG. 5, which shows a timing diagram of the formatting procedure FM and the burn-in test procedure BI according to another embodiment. In FIG. 5, the batch automatic test device 100 have the parallel processing capability, such that the formatting procedure FM can be performed on the solid state disks 900 at the same time. The required times for performing the formatting procedure FM on the solid state disks 900 are not necessarily the same. After the formatting procedure FM is completely performed on the first solid state disks 900 at the time point t51, the burn-in test procedure BI is immediately performed on the first solid state disks 900 without any interruption. After the formatting procedure FM is completely performed on the second solid state disks 900 at the time point t52, the burn-in test procedure BI is immediately performed on the second solid state disks 900 without any interruption. As such, the for performing the formatting procedure FM and the burn-in test procedure BI on the solid state disks 900, the operator does not need to insert and remove the solid state disks 900 one by one.

According to the embodiments described above, after the solid state disks 900 are coupled to the batch automatic test device 100 by the operator, the scanning procedure, the formatting procedure and the burn-in test procedure are performed on the solid state disks 900 without inserting and removing the solid state disks 900 one by one. The operations are significantly speeded up and the chance of operational errors is reduced.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A batch automatic test method for a plurality of solid state disks, wherein the batch automatic test method is used for automatically testing the solid state disks by a batch automatic test device, the solid state disks are coupled to the batch automatic test device, and the batch automatic test method includes:
   scanning a plurality of buses of the batch automatic test device to mark the solid state disks and a system disk;
   displaying a piece of disk information of each of the solid state disks, wherein each of the pieces of the disk information includes a disk location of each of the solid state disks;
   performing, synchronously, a formatting procedure on the solid state disks according to the disk locations; and
   performing, automatically and synchronously, a burn-in test procedure on the solid state disks after performing the formatting procedure.

2. The batch automatic test method according to claim 1, wherein in the formatting procedure, each of the solid state disks is formatted to be a MBR Waster Boot Record) disk or a GPT (GUID Partition Table) disk, and each of the solid state disks is formatted to be a FAT file system disk, a HPFS file system disk or a NTFS file system disk.

3. The batch automatic test method according to claim 1, wherein in the burn-in test procedure, each of the solid state disks is performed a plurality of simulation tests to test a durability, a reliability and a stability.

4. The batch automatic test method according to claim 1, wherein if one of the solid state disks does not pass the formatting procedure, a failed message is displayed.

5. The batch automatic test method according to claim 4, wherein if one of the solid state disks does not pass the formatting procedure, others of the solid state disks which pass the formatting procedure, are still performed the burn-in test procedure.

6. The batch automatic test method according to claim 1, wherein each of the pieces of the disk information includes a hard disk capacity, a serial number and a model number of each of the solid state disks.

7. A batch automatic test device, for automatically testing a plurality of solid state disks, wherein the batch automatic test device includes:
   a plurality of buses, configured to be coupled to the solid state disks;
   a scanning unit, configured to scan the buses, to mark the solid state disks and a system disk;
   a display unit, configured to display one piece of disk information of each of the solid state disks, wherein each of the pieces of the disk information includes a disk location of each of the solid state disks;
   a formatting unit, configured to synchronously perform a formatting procedure on the solid state disks according to the disk locations; and
   a burn-in unit, configured to automatically and synchronously perform a burn-in test procedure on the solid state disks after performing the formatting procedure.

8. The batch automatic test device according to claim 7, wherein in the formatting procedure, each of the solid state disks is formatted to be a MBR Waster Boot Record) disk or a GPT (GUID Partition Table) disk, and each of the solid state disks is formatted to be a FAT file system disk, a HPFS file system disk or a NTFS file system disk.

9. The batch automatic test device according to claim 7, wherein in the burn-in test procedure, each of the solid state disks is performed a plurality of simulation tests to test a durability, a reliability and a stability.

10. The batch automatic test device according to claim 7, wherein if one of the solid state disks does not pass the formatting procedure, the display unit displays a failed message.

11. The batch automatic test device according to claim 10, wherein if one of the solid state disks does not pass the formatting procedure, the burn-in unit still performs the burn-in test procedure on others of the solid state disks which pass the formatting procedure.

12. The batch automatic test device according to claim 7, wherein each of the pieces of the disk information includes a hard disk capacity, a serial number and a model number of each of the solid state disks.

* * * * *